United States Patent [19]

Taki et al.

[11] 4,439,321

[45] Mar. 27, 1984

[54] FILTER MEANS

[75] Inventors: Yoshihiro Taki, Nagoya; Hajime Akado, Anjo; Toshiaki Fukuta, Anjo; Susumu Miyakawa, Kariya, all of Japan

[73] Assignee: Nippondenso Co., Ltd., Kariya, Japan

[21] Appl. No.: 388,169

[22] Filed: Jun. 14, 1982

[30] Foreign Application Priority Data

Jun. 23, 1981 [JP] Japan .................................. 56-97036
Jun. 23, 1981 [JP] Japan .................................. 56-97037

[51] Int. Cl.$^3$ ........................ B01D 27/06; B01D 50/00
[52] U.S. Cl. ........................... 210/493.1; 210/493.5; 210/503; 55/484; 55/492; 55/521
[58] Field of Search ............... 210/493.3, 493.4, 493.5, 210/494.1, 497.2, 497.1, 168, 416.4, 416.5, 492, 503; 55/132, 498, 521, 524, 529, 484, 485, 159

[56] References Cited

U.S. PATENT DOCUMENTS

| 3,056,501 | 10/1962 | Thorman et al. | 210/168 |
| 4,093,437 | 6/1978 | Ichihara et al. | 55/524 |
| 4,313,740 | 2/1982 | Kalishman | 55/487 |

FOREIGN PATENT DOCUMENTS

| 728093 | 11/1942 | Fed. Rep. of Germany | 55/521 |
| 883049 | 6/1943 | France | 55/521 |

Primary Examiner—Charles N. Hart
Assistant Examiner—Wanda L. Millard
Attorney, Agent, or Firm—Cushman, Darby & Cushman

[57] ABSTRACT

A filter means for filtering fluid comprises a first filter section and a second filter section. The filter means is formed by using a folded sheet material having a trapezoid or a sector form. The second filter section of the filter means has a filtering performance different from that of the first filter section of the filter means.

4 Claims, 27 Drawing Figures

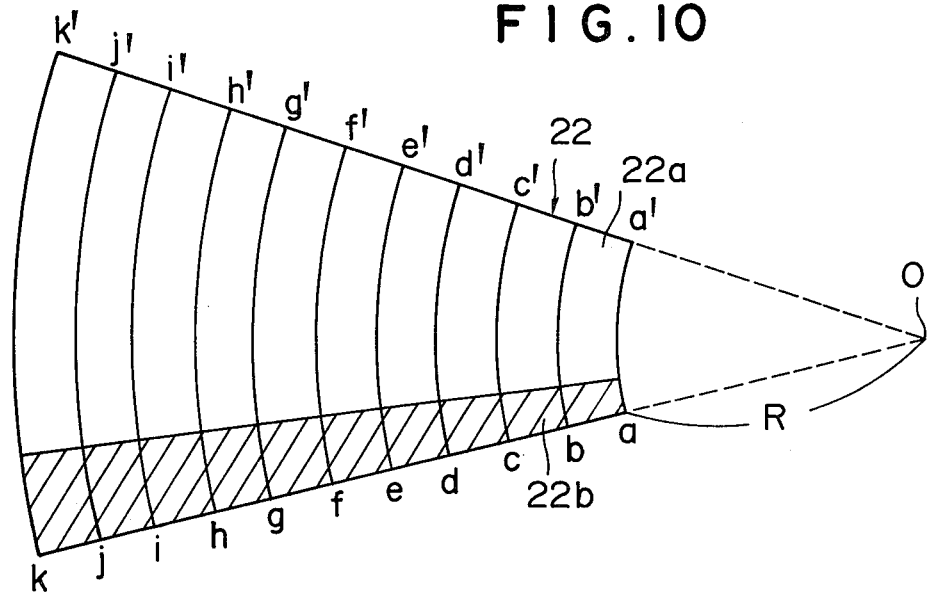
FIG. 10
FIG. 11
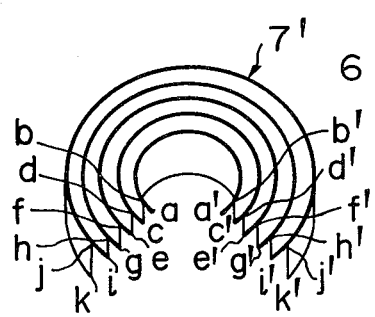
FIG. 12
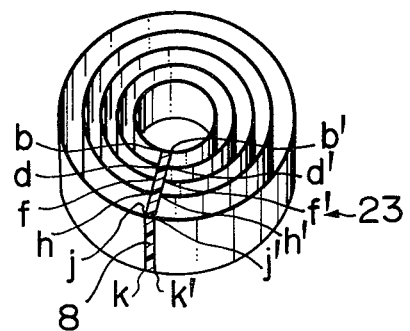

FILTER MEANS

BACKGROUND OF THE INVENTION

Field of the Invention

The present invention relates to a filter means for filtrating fluids.

BRIEF DESCRIPTION OF THE DRAWINGS

FIG. 10 shows a sheet material incorporated in a filter means of a second embodiment of the invention shown in FIG. 12;

FIG. 11 is an illustration of a folded sheet material;

FIG. 12 is a perspective view of the filter means of the second embodiment;

DESCRIPTION OF THE PRIOR ART

Figure 1:
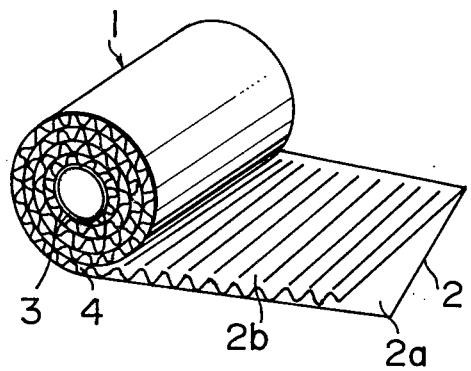
FIG. 1 is a perspective view of a conventional filter means.

FIG. 1 shows a well-known vortical shape air filter means generally designated at a reference numeral 1. The filter means 1 is constructed as explained below.

Figure 2:
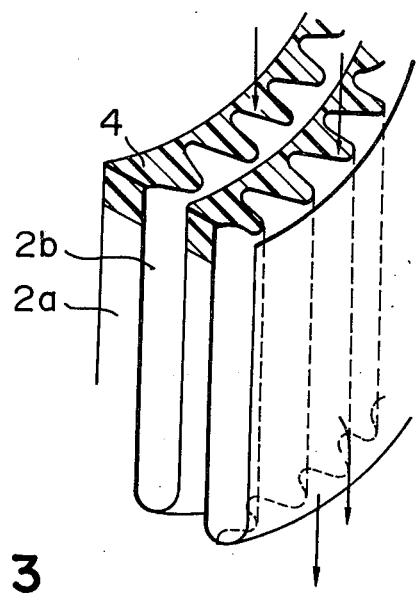
FIG. 2 is an enlarged fragmentary perspective view of the filter means shown in FIG. 1.

A sheet material 2 composed of a planar sheet half 2a and a corrugated sheet half 2b is prepared and is folded back at their boundary. The sheet material 2 is wound round a core 3 such that the corrugated sheet half 2a contacts the outer peripheral surface of the core 3, thereby constituting the filter means 1. As shown in FIG. 2, the portion of the gap, which is defined between the planar portion 2a and the corrugated portion 2b of the next layer and exposed to the air to be filtered is filled with an adhesive 4 to form a sealed portion. In the filter means of the type described, air to be filtered flows along the flow passages defined between the planar portions 2a and the corrugated portions 2b as indicated by arrows in FIG. 2 and is cleaned as it permeates and flows through the walls of the passages.

This known vortical type filter, however, has the following drawbacks.

(1) Since the folded-back sheet material is wound in a spiral form around the core, the portion of the sheet material constituting the radially outer portion is required to have a length greater than that of the portion constituting the radially inner portion. This problem is serious particularly when the diameter of the spirally wound filter means becomes large. In consequence, the corrugated portion 2b, which is intended for preventing the adjacent planar portions 2a, 2a of the folded-back sheet material from contacting each other, is collapsed undesirably to decrease the inlet area for the air to be cleaned, resulting in an increased resistance against the flow of air.

(2) As stated before, portion of the gap defined between the planar portion 2a and the corrugated portion 2b of the next layer and exposed to the air to be filtered is filled with an adhesive. Therefore, only about a half of the whole area of the filter means exposed to the air is utilized for actually receiving the incoming air. Consequently, the resistance against the air to be filtered is increased inconveniently.

(3) The area taking part in the filtration is decreased due to the adhesive filling the above-mentioned portion of the gaps. The adhesive is liable to be separated from the portions 2a, 2b of the filter means due to an external force acting on the same so that a gap or gaps are formed between the adhesive 4 and the portion 2a and/or the portion 2b. These gaps inconveniently permit the air to be filtered to pass therethrough without being filtered, so that the cleaning effect is deteriorated seriously.

SUMMARY OF THE INVENTION

Accordingly, an object of the invention is to provide a filter means capable of overcoming the above-described drawbacks of the prior art.

To this end, according to one aspect of the invention, there is provided a filter means formed of a filter element made of a trapezium or a sector-shaped sheet material.

According to another aspect of the invention, there is provided a filter means in which a portion of the filter element is made to have a filtering performance different from that of the remainder portion of the filter element.

According to still another aspect of the invention, here is provided a filter means in which the filter element is provided with an additional filter element having a different filtering performance.

DESCRIPTION OF THE PREFERRED EMBODIMENTS

Preferred embodiments of the invention will be described hereinunder with reference to the accompanying drawings.

Figure 3:
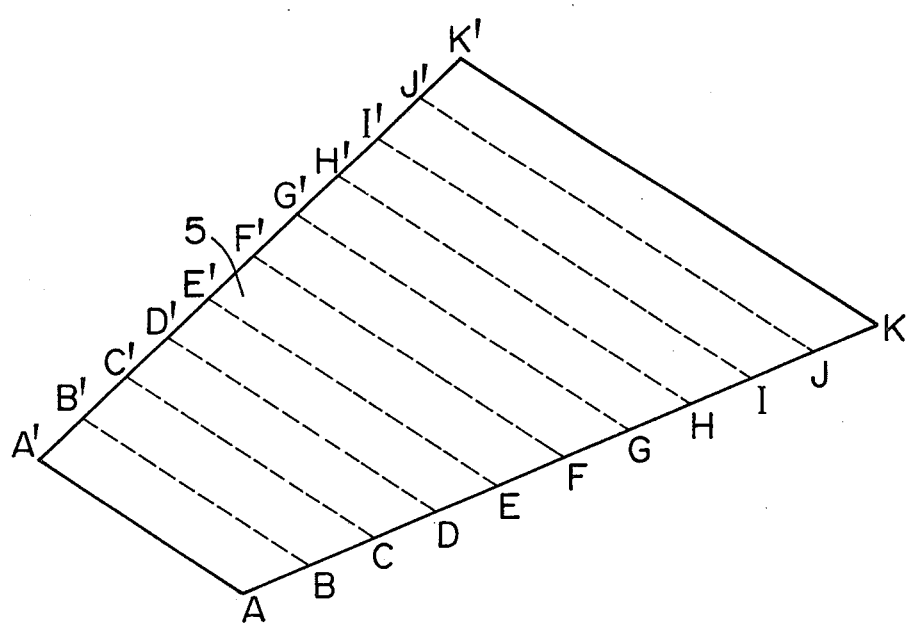
FIG. 3 is an illustration of a sheet material incorporated in a basic filter means in accordance with the invention.

Basically, the filter element incorporated in the filter means of the invention is formed of a stretchable trapezium sheet material 5 having ends of different lengths as shown in FIG. 3.

Figure 4:
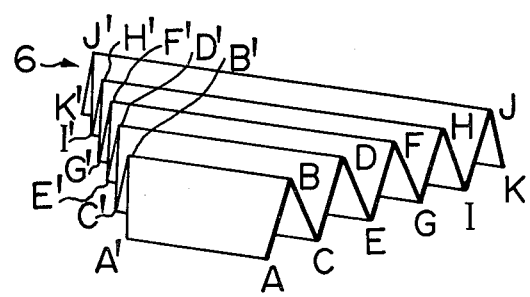
FIG. 4 is an illustration of a folded sheet material.

A longitudinal axis line of the trapezium sheet material is divided into a plurality of sections of an equal length, and lines B—B', C—C', . . . , J—J' are formed perpendicularly to the longitudinal axis line at respective points of division. The trapezium sheet material is then folded in the alternating direction along the respective lines so that a folded sheet material 6 having a corrugated cross-section is obtained as shown in FIG. 4. This folded sheet material 6 is then wound in a loop-like form with the section AA'BB' of the smallest area located at the innermost position and the opposing ends are jointed to each other by a resin 8 to provide a filter element 7 in the form of concentric circles.

Figure 6:
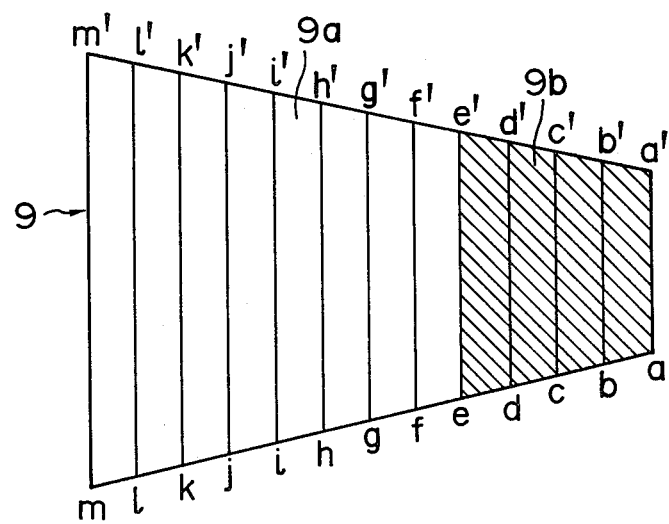
FIG. 6 is an illustration of a sheet material incorporated in a filter means of a first embodiment of the invention shown in FIG. 7.
Figure 7:
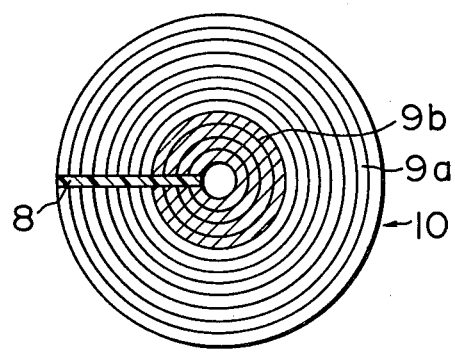
FIG. 7 is a plan view of the filter means of the first embodiment of the invention.

The filter means of the invention is characterized in that the above-mentioned filter element has the following feature. a trapezium sheet material 9 shown in FIG. 6 has a plurality of equi-spaced folding lines b—b', c—c', . . . , e—e', as the same in the case of the sheet material 5 mentioned above. In addition, the portion 9b defined by lines interconnecting the points a, e, e' and a' is made to have a higher filtering performance than the remainder portion 9a of the trapezium sheet material 9 has. This sheet material 9 is folded as explained before to constitute a filter element 10 in the form of concentric circles in which the high filtering performance portion 9b takes the radially inner position while the low filtering performance portion 9a takes the radially outer portion as shown in FIG. 7. The opposing ends of the filter element is bonded by a resin 8 also in this case. Throughout the specification, the term "high filtering performance" is used to mean "high air permeability".

Hereinafter, an explanation will be made to the construction and the operation of an air cleaner 20 for automotive engines incorporating the filter means 10 shown in FIG. 7.

Figure 8:
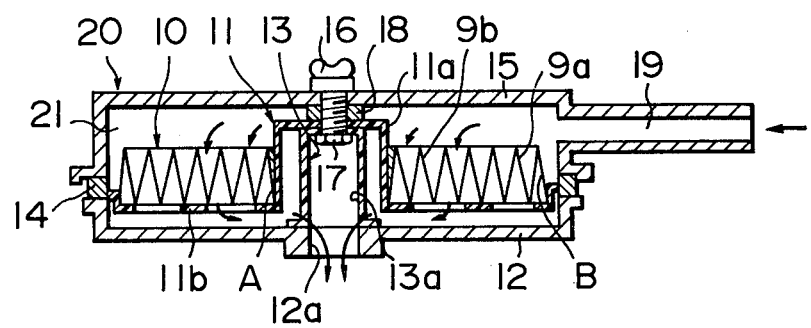
FIG. 8 is a sectional view of an air cleaner for automotive engine incorporating the filter means shown in FIG. 7.
Figure 9:
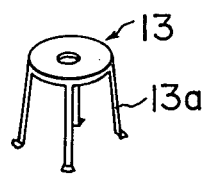
FIG. 9 is a perspective view of a supporting frame used in the air cleaner shown in FIG. 8.

Referring to FIG. 8, a receiver 11 made of a resin has an elliptic cylinder portion 11a adapted to fit the inner peripheral surface of the filter element 10 and a porous supporting portion 11b having an elliptic form adapted to support the bottom of the filter element 10. The filter element 10 is bonded at its inner peripheral surface to the outer peripheral surface of the elliptic cylinder portion 11a of the receiver 11 by an adhesive A. On the other hand, the outer peripheral surface of the filter element 10 is bonded by an adhesive B to the supporting portion 11b of the receiver 11. The receiver 11 is placed on a supporting frame 13 (shown in FIG. 9) which is made of a resin and has four legs 13a. The supporting frame 13 is fixed to a cover 12 around a central opening 12a of the latter. A gasket 14 is bonded to the outer peripheral surface of the receiver 11 over the entire periphery of the latter. More specifically, the gasket 14 is placed on the flange of the cover 12 and is covered by a cap 15 to define a chamber 21. The cap 15 and the cover 12 are fixed to each other by means of a bolt 16 extending through the cap 15, receiver 11 and the supporting frame 13 and a nut 17 cooperating with the bolt 16. Since the gasket 14 is clamped between the flanges of the cap 15 and of the cover 12, it is possible to retain the chamber 12 in a gas-tight manner. A gasket 18 is used to prevent air leaking through the gap between the bolt 16 and the bores through which the bolt 16 extends.

In operation, the air to be filtered is introduced through an inlet port 19 in a direction tangential to the circle of the filter element 10 and is cleaned as it flows through the filter element 10. The cleaned air is then supplied to an engine through the holes formed in the supporting portion 11b of the receiver 11, the spaces between adjacent legs 13a of the supporting frame 13 and the central opening 12a of the cover 12. In the described embodiment, the radially inner portion 9b of the filter element 10 has a higher filtering performance than the radially outer portion 9a of the same. In consequence, the air flows at a higher velocity in the radially inner portion 9b than in the radially outer portion 9a of the filter element, so that the flow of the air is uniformalized over in entirety of the filter element 10 to improve the cleaning efficiency and the durability of the filter means.

In the filter means described heretofore, the filter element is made from a trapezium sheet material. This, however, is not exclusive and the filter element may be formed from a sector-shaped sheet material as will be understood from the following description.

Another embodiment of the invention making use of a sector-shaped sheet material will be described hereinunder.

Referring first to FIGS. 10 to 12, there is prepared a sector-shaped sheet material 22 as shown in FIG. 10. Concentric arcs bb', cc', . . . , jj' are scribed on the sector-shaped sheet material 22 at a constant radial pitch around a common point 0 which is the center of the sector shape of the sheet material 22. Then, the sheet material 22 is folded in alternating directions along the arcs bb', cc', . . . , jj' to become a folded sheet material as shown in FIG. 11. Then, the folded sheet material is wound and the opposing edges thereof are connected to each other by a resin 8 to form a filter element 23 in the form of concentric circles in which, as shown in FIG. 12, the shortest arc aa' constitutes the inner circumference of the filter element 23 while the longest arc kk' constitutes the outer circumference of the filter element 23.

In this filter element 23, the sheet material 22 has such a sector shape that each arc intersects the both edge lines at a right angle. It is, therefore, possible to form the filter element 23 without any difference of the circumferential length. In this case, it is possible to use non-stretchable material such as filter paper, non-woven fabric, felt or the like as the sheet material. The scoring of the arcuate folding lines of the sheet material 22 is made by means of a scoring roller or by a heat process.

Figure 13:
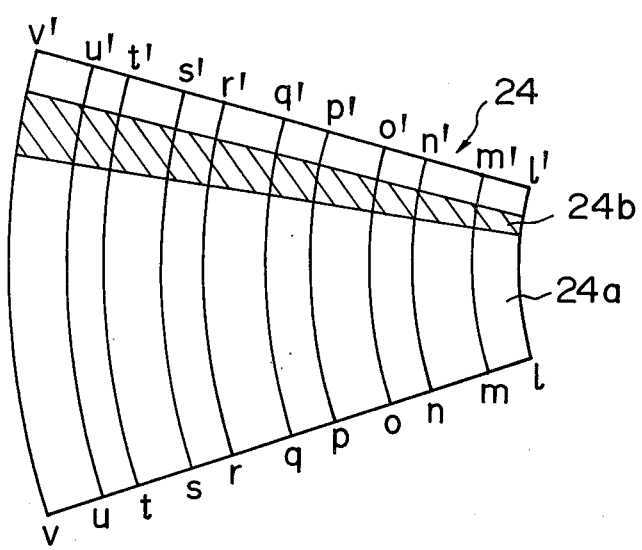
FIG. 13 is an illustration of a sheet material incorporated in a filter means of a third embodiment of the invention shown in FIG. 14.
Figure 14:
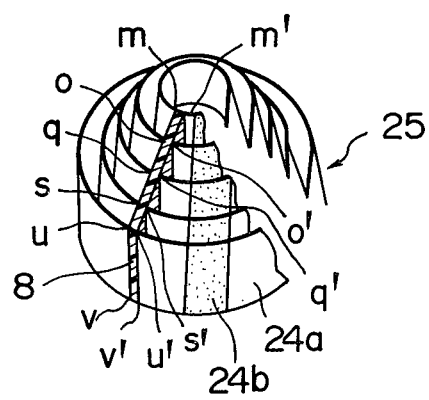
FIG. 14 is a perspective view of the filter means of the third embodiment.

Still another embodiment of the invention will be made hereinunder with reference to FIGS. 13 and 14. The sector-shaped sheet material 24 shown in FIG. 13 is scored in alternating directions as the same in the case of the sheet material shown in FIG. 10 but in this case the radial pitch of the score lines is changed alternatingly. More specifically, the sections 1-m, n-o, p-q, r-s and t-u have an equal length, while the sections m-n, o-p, q-r, s-t and u-v have an equal length which is greater than the first-mentioned length. This sheet material 24 is folded in the alternating directions along the arcuate lines and the opposing ends are jointed to each other by adhesive 8 thereby to form a filter element 25 as shown in FIG. 14. As will be seen from FIG. 14, the line interconnecting the top ridges of the continuous corrugation and the line interconnecting the bottoms of the corrugation extend in parallel with each other and are inclined downwardly with respect to the axis of the filter element 25.

Figure 15:
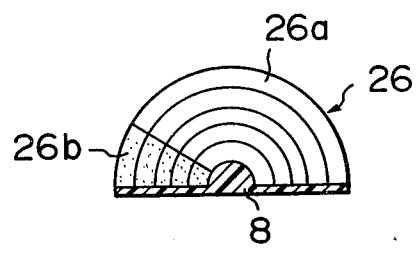
FIG. 15 is a plan view of a filter means of a fourth embodiment of the invention.

FIG. 15 shows a filter element 26 which is formed of a sheet material similar to the sheet material 22 shown in FIG. 10 but having arc lengths which amount to half of that of the sheet material 22. The filter element 26 has a semi-cylindrical form and is sealed at its end surface and inner peripheral surface with a resin 8.

Figure 16:
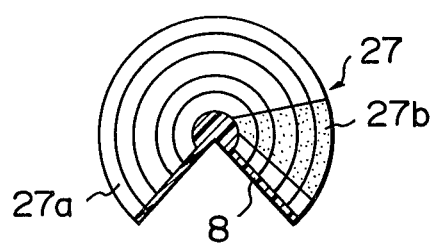
FIG. 16 is a plan view of a filter means of a fifth embodiment of the invention.

The filter element 27 shown in FIG. 16 is composed of a sheet material similar to the sheet material 22 shown in FIG. 10 but the lengths of the arcuate lines amount to ¾ of those of the sheet material 22. The end surface and the inner peripheral surface of the filter element 27 are sealed by a resin 8.

Figure 17:
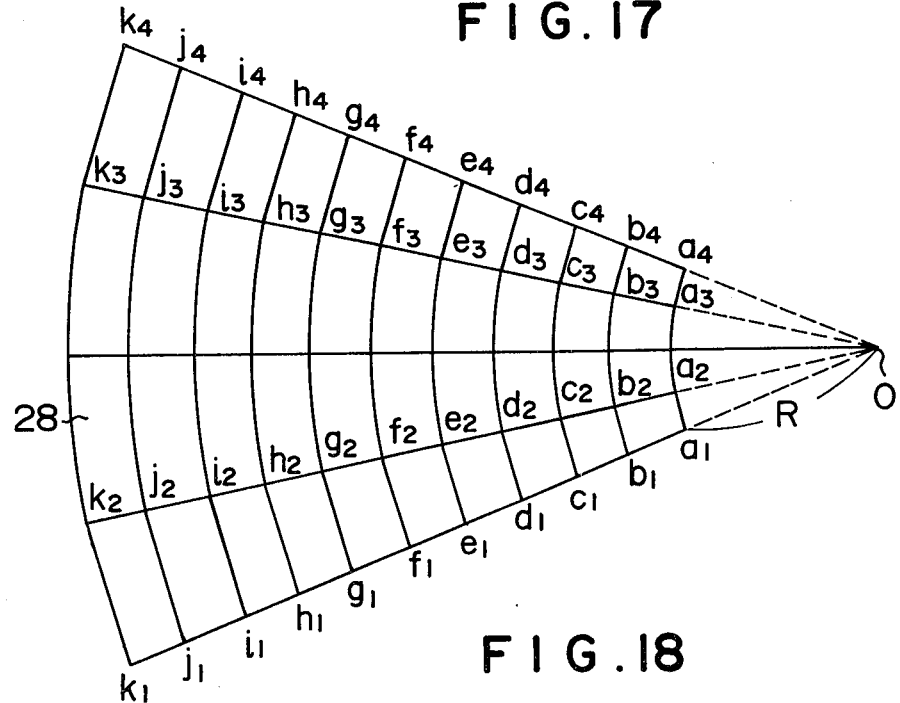
FIG. 17 is an illustration of a sheet material incorporated in a filter means of a sixth embodiment of the invention shown in FIG. 18.
Figure 18:
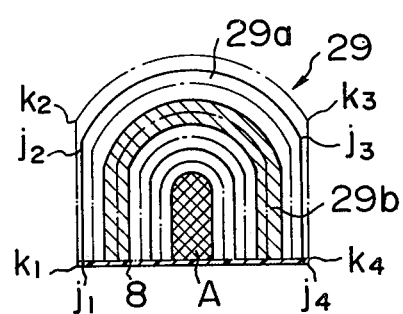
FIG. 18 is a plan view of the filter means of the sixth embodiment of the invention.
Figure 19:
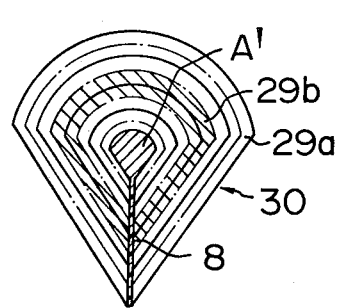
FIG. 19 is a perspective view of a filter means of a seventh embodiment of the invention incorporating the sheet material shown in FIG. 17.
Figure 20:
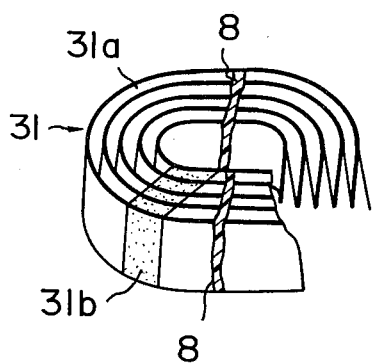
FIG. 20 is a fragmentary perspective view of a filter means of an eighth embodiment of the invention incorporating a filter means shown in FIG. 18.

A further embodiment of the invention will be described hereinunder with reference to FIGS. 17 and 18. A sheet material 28 shown in FIG. 17 has a substantially sector shape. A group of arcs $a_2a_3$, $b_2b_3$, ..., $j_2j_3$ and $k_2k_3$ of different radii centered at the point 0 are scored on the central portion of the sheet material 28. Also, straight lines $a_1$-$a_2$, $a_3$-$a_4$, $b_1$-$b_2$, $b_3$-$b_4$, ..., $j_1$-$j_2$, $j_3$-$j_4$, $k_1$-$k_2$ and $k_3$-$k_4$ are scored to extend from both ends of respective arcs as illustrated. The scored sheet material 28 is then folded in alternating directions and curved to surround a core A made of an impermeable material such as a resin. The ends of the folded sheet material 28 are sealed with a resin 8 to form a filter element 29. The core A is bonded to the inner side of the filter element 29 by means of an adhesive. A filter element 30 shown in FIG. 19 is obtained by jointing the opposing ends of the folded sheet material 28 by means of a resin 8. A filter element 31 shown in FIG. 20 having an elliptic cylinder form is produced by preparing a pair of folded sheet materials 28 and jointing the opposing ends of each folded sheet material 28 by means of a resin 8. This filter means is devoid of the core A.

Figure 21:
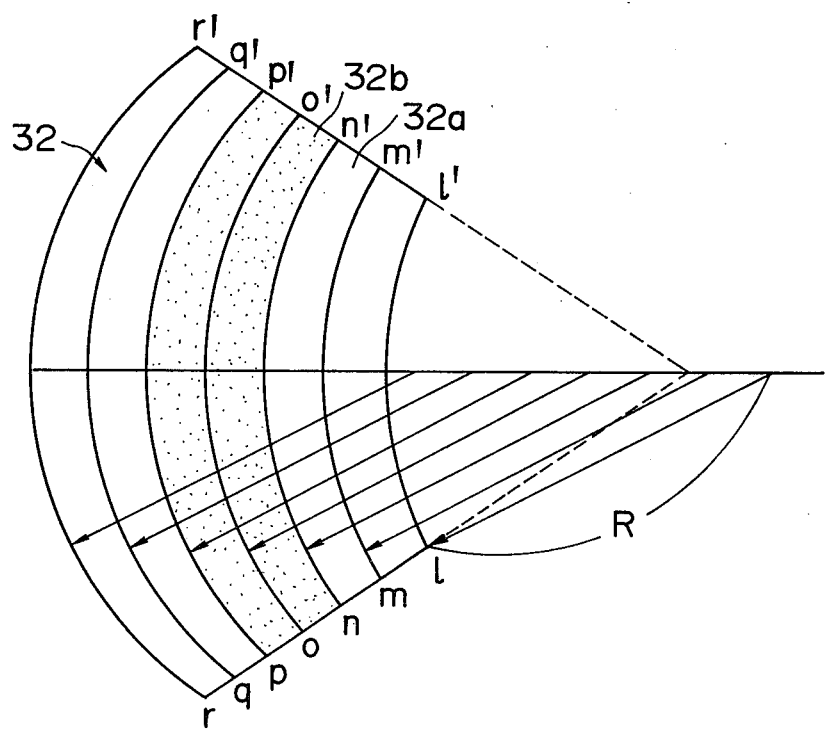
FIG. 21 is an illustration of a sheet material incorporated in a filter means shown in FIG. 22.
Figure 22:
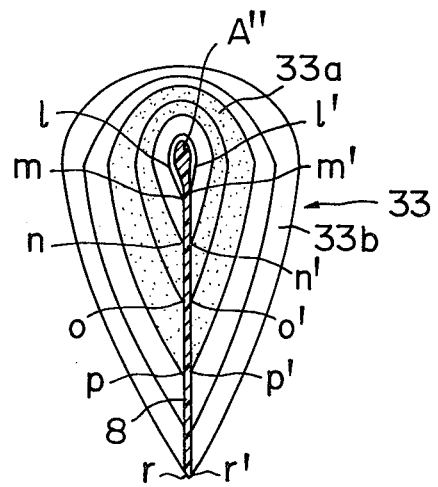
FIG. 22 is a plan view of the filter means of a nineth embodiment of the invention.

A still further embodiment will be described in conjunction with FIGS. 21 and 22. A sheet material 32 has a substantially sector shape. Arcs $ll'$, $mm'$ ... and $rr'$ are scored on the sheet material 32 at an equal radius around different points located on the neutral axis of the sheet material 32. The sheet material 32 is folded in alternating directions along the arcuate lines and the opposing ends are jointed by a resin 8 thereby to form a filter element 33. A core A" is bonded to the inner side of the filter element 33.

Figure 23:
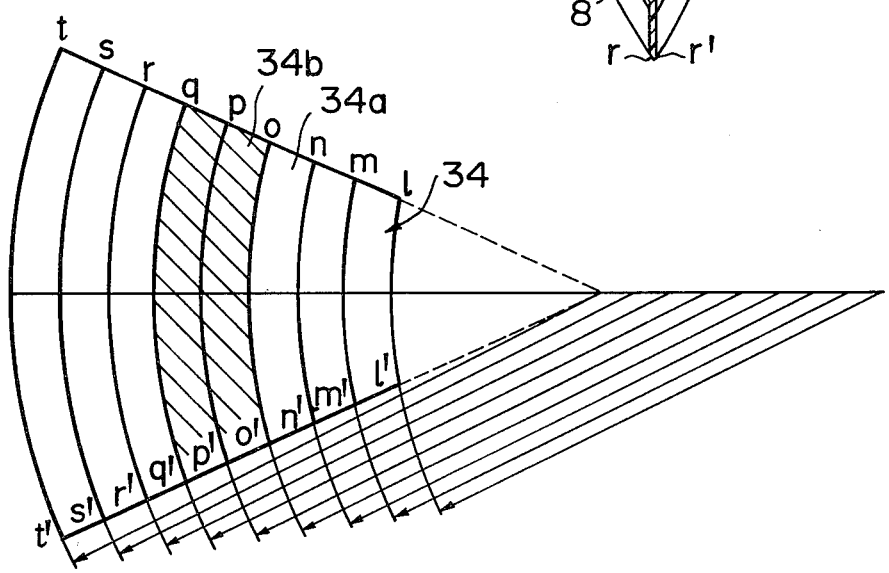
FIG. 23 is an illustration of a sheet material incorporated in a filter means shown in FIG. 24.
Figure 24:
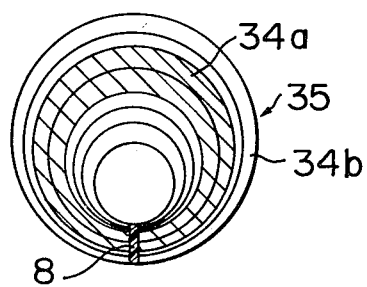
FIG. 24 is a plan view of the filter means of a tenth embodiment of the invention.

A still further embodiment of the invention will be described with reference to FIGS. 23 and 24. A sheet material 34 has a substantially sector shape. Arcs $ll'$, $mm'$ ..., and $tt'$ are scored on the sheet material 34 at different radii around different points located on the neutral axis. The sheet material 34 is folded in the alternating directions along the arcs and the opposing ends are jointed by a resin 8 thereby to form a filter element 35.

Figure 25:
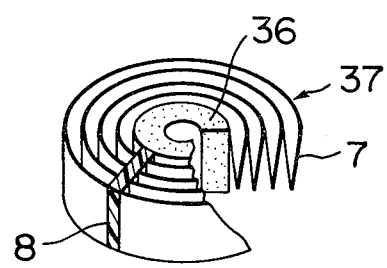
FIG. 25 is a fragmentary perspective view of a filter means of an eleventh embodiment of the invention.
Figure 26:
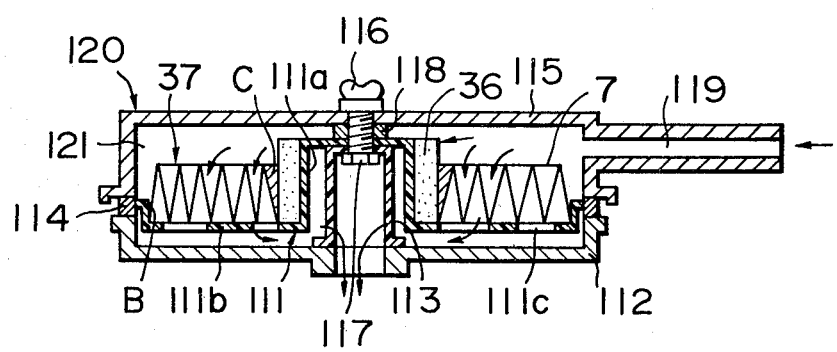
FIG. 26 is a sectional view of an air cleaner for automotive engines incorporating the filter means shown in FIG. 25.
Figure 27:
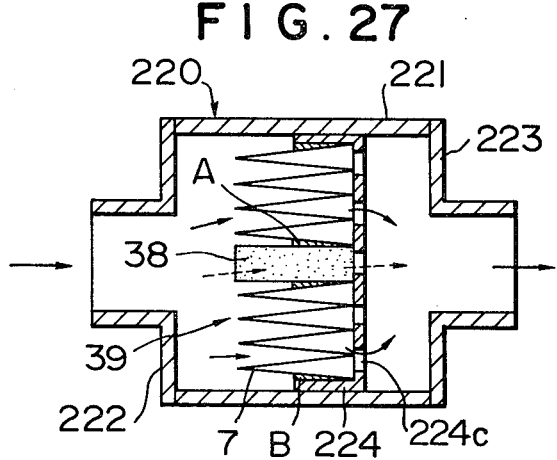
FIG. 27 is a sectional view of a lubricating oil cleaner incorporating a modofication of the filter means shown in FIG. 25.

According to the invention, as shown in FIG. 25, a filter means 37 is produced by attaching to the inner side of the filter element 7 (shown in FIG. 5) an additional filter element 36 having a filtering performance different from that of the filter element 7, by means of a resin C (shown in FIG. 26). The additional filter element 36 is formed from a material having a higher filtering performance such as urethane foam, but may be formed of a material having a lower filtering performance such as felt, fiber or the like. The filter element 7 is made of a stretchable material such as non-woven fabric as stated before.

An explanation will be made hereinunder as to an air cleaner 120 for automotive internal combustion engines incorporating the filter means 37 shown in FIG. 25. Referring to FIG. 26, a reference numeral 111 designates a receiver made of a resin and having an elliptic cylinder portion 111a adapted t fit the inner peripheral surface of the additional filter element 36 and a supporting portion 111b with holes 111c formed integrally with the cylinder portion so as to support the bottom of the filter means 37 and having an elliptic form. The inner peripheral surface of the additional filter element 36 fits around the cylinder portion 111a of the receiver 111. On the other hand, the outer peripheral surface of the filter means 37 is bonded to the supporting portion 111b of the receiver 111 by means of a bond B. The receiver 111 is placed on a resinous supporting frame 113 and fixed to the portion of a cover 112 adjacent to a central opening formed in the cover 12. A gasket 114 is bonded to the outer peripheral surface of the receiver 111 over the entire circumference of the latter. The gasket 114 is placed on the flange of the cover 112 and is covered by a cap 115 to define a chamber 121. The cap 115 and the cover 112 are coupled to each other by means of a bolt 116 extending through the cap 115, receiver 111 and the supporting frame 113, and a nut 117 cooperating with the bolt 116. The chamber 121 is sealed in a gas-tight manner because the gasket 114 is clamped between the flanges of the cap 115 and of the cover 112. A gasket 114 is provided for preventing air leaking through the gap between the bolt 116 and the bores through which the bolt 116 extends.

In operation of the air cleaner 120, the air to be filtered is introduced through the inlet port 119 in a direction tangential to the circle of the filter means 37 and is cleaned as it passes through the filter means 37. The cleaned air is supplied to the engine through holes 111c formed in the supporting portion 111b and then through the central opening in the cover 112.

Figure 5:
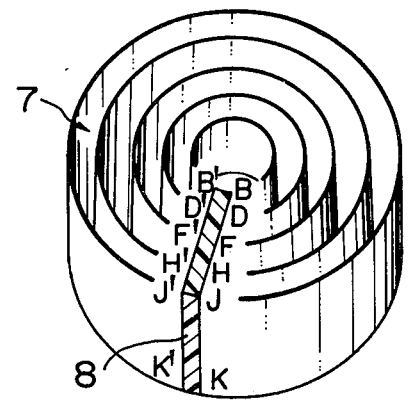
FIG. 5 is a perspective view of the basic filter means in accordance with the invention.

An explanation will be made hereinunder as to a filter 220 (shown in FIG. 26) for automatic lubrication oil incorporating a filter means 39 in which the centre portion of the filter element 7 shown in FIG. 5 is filled with an additional filter element 38 having a lower filtering performance than the filter element 7. A filtering chamber is defined by a tubular case 221 and two end walls 222, 233 having central openings and attached to both ends of the tubular case 221. The filter means 39 is fixed to a receiver 224 having holes 224c on the bottom by means of an adhesive B.

This receiver 224 is fixed to the inner periphery of the tubular case 221 so as to intersect the axis line of the tubular case 221 at a right angle. The oil to be filtered is introduced into the chamber through the opening in the cap 222 as indicated by arrows and is cleaned as it flows through the filter means 39 before it is discharged through the opening in the cap 223. The additional filter element 38 provided at the central portion of the filter means 39 has a filtering performance lower than that of the filter element 7, so that the flow velocity of the lubricating oil in the central portion of the filter means 39 is comparatively low, so that the additional filter element 38 serves as a by-pass. It is thus possible to obtain a by-pass filter.

Although in the above-described embodiment the additional element of the lower filtering performance is provided at the inner portion of the basic filter element, such an arrangement is not exclusive and the additional element of the lower filtering performance may be provided at the outer portion of the basic filter element.

Although the invention has been described through specific terms, it is to be noted that the described embodiments are only illustrative and various changes and modifications may be imparted thereto as exemplarily shown below.

(1) The portion of a different filtering performance may be provided at a plurality of points of the filter means.

The filter means of the invention offers the following advantages.

(1) In the filter means of the invention, it is not necessary to fill the gaps exposed to the air to be cleaned with a resin as in the case of the conventional vortical shape air filter. Consequently, it is possible to utilize the whole part of the exposed area as the area for receiving the incoming air.

(2) It is not necessary to use an adhesive except for the bonding of the opposing ends of the filter element. It is, therefore, possible to avoid the undesirable by-pass flow of air through the gap formed as a result of separation of the adhesive. This in turn eliminates the fear that the air is introduced into the engine detouring the air filter without being cleaned.

(3) The reduction of the filtering area caused by the presence of the adhesive is prevented.

(4) It is possible to eliminate any flow resistance against the air which has been encountered in the conventional air filter due to the presence of the adhesive layer.

(5) By making a portion of the filter means have a filtering performance different from that of the remainder portion of the same, it is possible to uniformalize the flow velocity of the fluid filtered by the filter means, and to decrease the load on the main filter element. This in turn prolongs the life of the filter means considerably.

What is claimed is:

1. A fluid cleaner assembly comprising:
   a casing;
   a generally circular filter means for filtering fluid disposed within said casing;
   an inlet port provided in said casing so as to be communicated with one axial end of said filter means; and
   an output port provided on said casing so as to be communicated with the other axial end of said filter means and so as to be located adjacent to a substantial centre portion of said filter means,
   said filter means having two-dimensional wave forms spreading radially from an axis of said filter means and has a first and a second filter sections which are made of one sheet material,
   said first filter section having a higher permeability than said second filter section,
   said first filter section being disposed adjacent to a substantial centre portion of said filter means, and
   said first and second filter sections being arranged in parallel to each other with respect to an axial direction of said filter means.

2. A fluid cleaner assembly as claimed in claim 1, wherein a plurality of crests of said two-dimensional wave forms define closed concentric curves, and the heights of said wave forms are equal in said radial spreading direction.

3. A fluid cleaner assembly as claimed in claim 2, wherein said first filter section is disposed in a radial centre portion of said crests and arranged in closed loops.

4. A fluid cleaner assembly as claimed in claim 3, wherein:
   said sheet material comprises a strip-like filtering element of generally trapezoidal shape having one lengthwise end longer than the other lengthwise end thereof,
   a region of said filtering element which is adjacent said other lengthwise end having a higher permeability than the rest of said filtering element,
   said filter means is formed by means of corrugating said filter element between said the one and said the other lengthwise ends,
   the corrugated filtering element is curved so that said the one lengthwise end becomes outer side and said the other lengthwise end becomes inner side, and
   respective widthwise edges of each said curved end are adhered to each other to form said filter means.

* * * * *